(12) United States Patent
Huelsen et al.

(10) Patent No.: US 12,092,755 B2
(45) Date of Patent: Sep. 17, 2024

(54) ROOF MODULE FOR FORMING A VEHICLE ROOF COMPRISING A COOLER

(71) Applicant: Webasto SE, Stockdorf (DE)

(72) Inventors: Michael Huelsen, Stockdorf (DE); Harald Bachmann, Stockdorf (DE); Achim Holzwarth, Stockdorf (DE); Cédric Langlais, Stockdorf (DE); Michael Mailhamer, Stockdorf (DE); Juraj Lehotsky, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 297 days.

(21) Appl. No.: 17/633,487

(22) PCT Filed: Aug. 12, 2020

(86) PCT No.: PCT/EP2020/072603
§ 371 (c)(1),
(2) Date: Feb. 7, 2022

(87) PCT Pub. No.: WO2021/032562
PCT Pub. Date: Feb. 25, 2021

(65) Prior Publication Data
US 2022/0283263 A1 Sep. 8, 2022

(30) Foreign Application Priority Data
Aug. 19, 2019 (DE) ...................... 10 2019 122 190.0

(51) Int. Cl.
*G01S 7/02* (2006.01)
*B60H 1/00* (2006.01)
(Continued)

(52) U.S. Cl.
CPC .......... *G01S 7/027* (2021.05); *B60H 1/00271* (2013.01); *B60R 11/04* (2013.01);
(Continued)

(58) Field of Classification Search
CPC ...... G01S 7/027; G01S 7/4813; G01S 13/931; G01S 2013/9327; G01S 17/931;
(Continued)

(56) References Cited

U.S. PATENT DOCUMENTS 11,240,941 B2 * 2/2022 Frederick ............. G05D 1/0088
2006/0256199 A1 11/2006 Takahashi
(Continued)

FOREIGN PATENT DOCUMENTS

DE 10319176 A1 11/2004
DE 103 60 005 A1 1/2005
(Continued)

OTHER PUBLICATIONS

Translation of International Search Report and Written Opinion for PCT/EP2020/072598 mailed Mar. 3, 2022, in English (8 pages).
(Continued)

*Primary Examiner* — Suman K Nath
(74) *Attorney, Agent, or Firm* — Fitch, Even, Tabin & Flannery, LLP

(57) ABSTRACT

A roof module for forming a motor vehicle roof, the roof module having a panel component whose outer surface at least partially forms a roof skin of the vehicle roof, the roof module having at least one environment sensor configured to send and/or receive electromagnetic signals for detecting the vehicle environment. The environment sensor is disposed below the roof skin formed by the panel component, the roof module having a cooler configured to discharge exhaust heat emitted by the environment sensor and/or heat introduced from outside from the environment sensor.

17 Claims, 1 Drawing Sheet

(51) Int. Cl.
*B60R 11/04* (2006.01)
*B62D 25/06* (2006.01)
*G01K 1/14* (2021.01)
*G01S 13/931* (2020.01)
*B60R 11/00* (2006.01)

(52) U.S. Cl.
CPC ............... *B62D 25/06* (2013.01); *G01K 1/14* (2013.01); *G01S 13/931* (2013.01); *B60R 2011/004* (2013.01)

(58) Field of Classification Search
CPC ...... B60H 1/00271; B60H 2001/00235; B60H 2001/003; B60R 11/04; B60R 2011/004; B62D 25/06; G01K 1/14
See application file for complete search history.

(56) References Cited

U.S. PATENT DOCUMENTS

| | | |
|---|---|---|
| 2014/0178635 A1 | 6/2014 | Imaizumi et al. |
| 2016/0119509 A1 | 4/2016 | Wato |
| 2016/0227079 A1 | 8/2016 | Oh |
| 2017/0070652 A1 | 3/2017 | Muller |
| 2017/0184945 A1 | 6/2017 | Carlson |
| 2017/0190300 A1 | 7/2017 | Maranville et al. |
| 2017/0261273 A1 | 9/2017 | Maranville et al. |
| 2018/0037267 A1 | 2/2018 | Williams et al. |
| 2018/0220555 A1 | 8/2018 | Schmidt |
| 2019/0003895 A1 | 1/2019 | Krishnan et al. |
| 2019/0210436 A1 | 7/2019 | Frederick et al. |

FOREIGN PATENT DOCUMENTS

| | | |
|---|---|---|
| DE | 10 2008 001 675 A1 | 11/2009 |
| DE | 10 2014 209 611 A1 | 11/2015 |
| DE | 10 2015 220 575 A1 | 4/2016 |
| DE | 10 2016 123 752 A1 | 7/2017 |
| DE | 10 2017 104 988 A1 | 9/2017 |
| DE | 10 2018 102 187 A1 | 8/2018 |
| DE | 10 2018 115 498 A1 | 1/2019 |
| DE | 11 2015 002 735 B4 | 11/2019 |
| EP | 3 054 666 A1 | 8/2016 |
| GB | 2402572 A | 12/2004 |
| JP | 2006319720 A | 11/2006 |

OTHER PUBLICATIONS

International Search Report for PCT/EP2020/072603 mailed Nov. 11, 2020, in English and German (7 pages).

Office Action issued against corresponding Korean Patent Application No. 10-2022-7006375; mailed Sep. 22, 2023; In Korean with English Translation (13 pages). Note: cited US ref: US2008/0185876 previously cited in a prior IDS.

\* cited by examiner

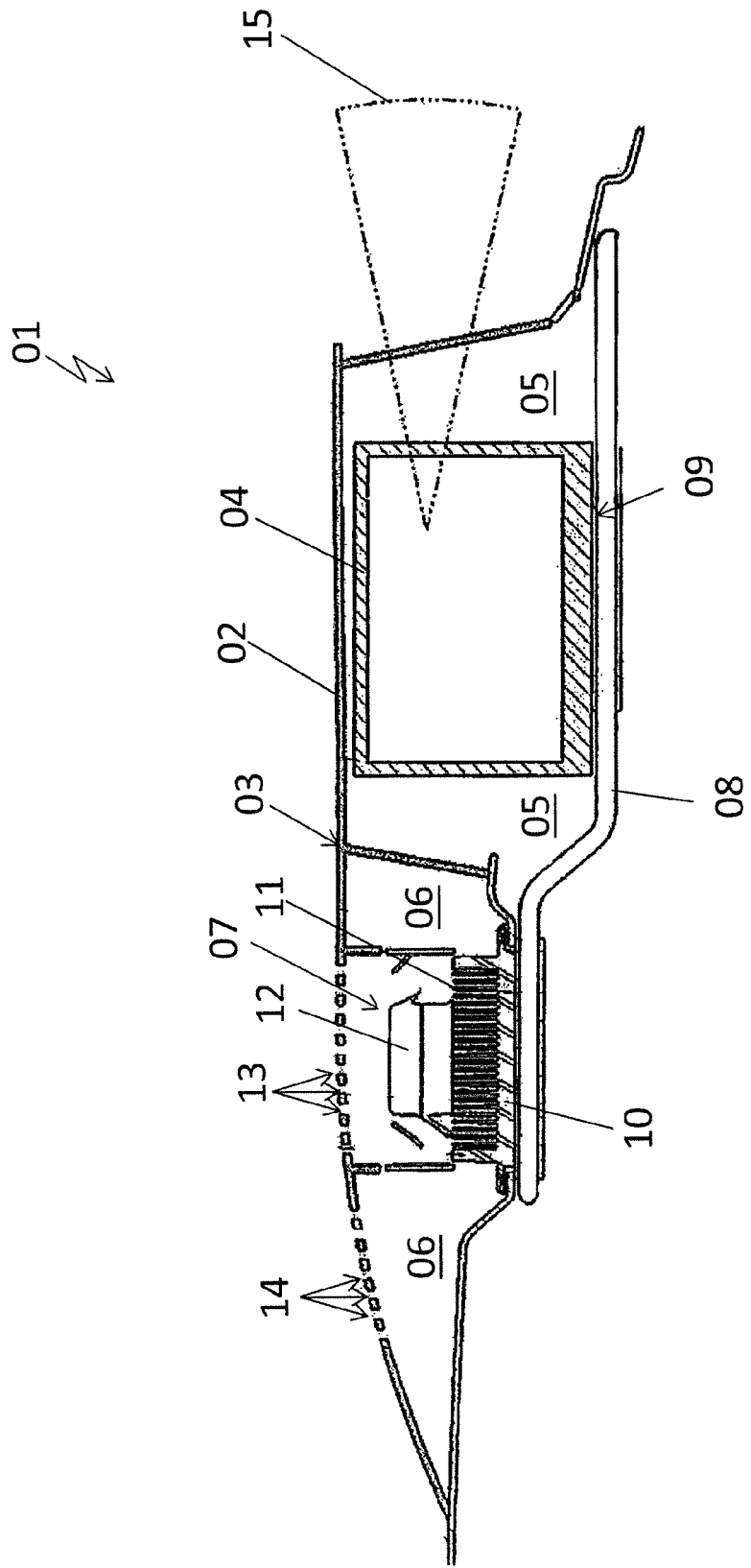

ROOF MODULE FOR FORMING A VEHICLE ROOF COMPRISING A COOLER

CROSS-REFERENCE TO RELATED APPLICATION

This application is a U.S. national phase application filed under 35 U.S.C. § 371 of International Application No. PCT/EP2020/072603, filed Aug. 12, 2020, designating the United States, which claims priority from German Patent Application Number DE 10 2019 122 190.0 filed on Aug. 19, 2019, which is hereby incorporated herein by reference in its entirety for all purposes.

FIELD

The invention relates to a roof module for forming a vehicle roof on a motor vehicle according to the preamble of claim 1.

BACKGROUND

Generic roof modules are widely used in vehicle construction since these roof modules can be prefabricated as separate functional modules and can be delivered to the assembly line when assembling the vehicle. At its outer surface, the roof module at least partially forms the roof skin of the vehicle roof, which prevents humidity and airflow from entering the vehicle interior. The roof skin is formed by a panel component made of a stable material, such as a painted metal plate or painted or dyed-through plastic. The roof module can be either a part of a rigid vehicle roof or a part of an openable roof component.

Autonomously or semi-autonomously driving vehicles are increasingly common in vehicle construction. A plurality of environment sensors which detect the environment of the motor vehicle and determine the current traffic situation are required in order to enable the vehicle controller to autonomously or semi-autonomously control the motor vehicle. To this end, the known environment sensors send and receive corresponding electromagnetic signals, such as laser beams or radar beams, a corresponding signal evaluation allowing a data model of the vehicle environment to be generated and used for controlling the vehicle. The known environment sensors are installed in corresponding sensor housings in order to protect the environment sensors from harmful environmental conditions, such as humidity and airflow. This sensor housing can then be mounted on top of the roof skin formed by the roof module in order to afford the environment sensor a 360° view.

Attaching a sensor housing to the roof module is disadvantageous in that the aerodynamic properties of the vehicle are negatively affected by the separate sensor housing. Moreover, the appearance of the vehicle is negatively affected by the sensor housing separately mounted on the roof skin of the roof module.

SUMMARY

Hence, the object of the present invention is to propose a roof module that avoids the disadvantages of the known state of the art described above.

This object is attained by a roof module of the teaching of claim 1.

Advantageous embodiments of the invention are the subject matter of the dependent claims.

The roof module according to the invention is characterized in that the environment sensor is disposed below the roof skin formed by the panel component. The environment sensor is therefore integrated in the roof module as a component and is not mounted on top of the roof module with a separate housing. This significantly improves the aerodynamics of the roof module and makes a more appealing vehicle design possible. According to the invention, the roof module further comprises a cooler in order to avoid heat buildup in the interior of the roof module due to the exhaust heat emitted by the environment sensor or due to heat introduced from outside, such as by solar radiation. The heat emitted by the environment sensor or any other heat can be discharged by means of the cooler, whereby an inadmissibly high operating temperature of the environment sensor can be avoided.

The roof module according to the invention can form a structural unit in which features for autonomous or semi-autonomous driving supported by driver assistance systems are integrated and which can be placed on a vehicle body by a vehicle manufacturer.

Furthermore, the roof module according to the invention can be a purely solid roof or can comprise a roof opening system. Additionally, the roof module can be configured for use in a passenger car or in a utility vehicle.

According to a preferred embodiment, the environment sensor is disposed in a dry section of the roof module, which is protected against humidity, in order to protect the environment sensor from damage caused by humidity. The cooler provided according to the invention ensures that the exhaust heat emitted by the environment sensor is discharged from the dry section. Heat buildup in the dry section is reliably precluded in this manner.

The exhaust heat can be discharged from the dry section in the roof module in basically any manner. According to a preferred embodiment, the cooler comprises at least one heat conducting element by means of which the exhaust heat emitted by the environment sensor can be discharged from the dry section.

With a view to a heat transfer of the exhaust heat emitted by the environment sensor to the heat conducting element that is as free from resistance as possible, it is particularly advantageous for the environment sensor to have a cooling surface. In this case, the environment sensor can come to rest on the heat conducting element via this cooling surface in order to establish a heat transfer with low conduction resistance. Basically any type of heat conducting element can be used for the heat conduction. The heat conduction is particularly effective if the heat conducting element is configured in the manner of a heat pipe or in the manner of a metal plate part. A heat pipe is a hollow body which is filled with a cooling liquid and can be made of copper, for example. The cooling liquid circulates within the hollow body in order to thus make the heat conduction more effective. The coolant circuit can be open or closed.

If a metal plate part is provided as the heat conducting element, it can preferably be configured in the manner of a support plate. The support plate can be part of the vehicle body shell or of the vehicle frame, for example. The support plate can also be part of the roof module frame or of a roof module support element. In many cases, the support plate allows the exhaust heat to be discharged effectively enough for an active cooling by means of, for example, a cooling fan to become unnecessary. Via the support plate, the heat can be discharged into other vehicle areas.

If the heat conducting element is configured in the manner of a support plate, the latter can be used to fix the environment sensor in the roof module. In this way, a highly effective heat transfer from the environment sensor to the support plate can be established.

The heat can be discharged via the heat conducting element at basically any point of the environment sensor. According to a first variation, the heat conducting element comes into contact with a cooling surface at the underside of the environment sensor. This makes installation particularly simple. Alternatively, the heat conducting element can come into contact with a cooling surface on at least one side surface of the environment sensor. For example, the heat conducting element can have an L-shaped or U-shaped end which surrounds the environment sensor on two or three side surfaces. The lateral contact between the environment sensor and the heat conducting element allows vertical installation space to be saved.

If the environment sensor is disposed in a dry section in order to be protected from humidity, the cooling of the environment sensor can be simplified if the roof module additionally comprises a wet section separate from the dry section of the roof module. In this case, the cooler is disposed in said wet section since an exchange of media through the wet section allows the exhaust heat to be discharged in a particularly effective manner.

If the dry section for accommodating the environment sensor and the wet section for accommodating the cooler are immediately adjacent, it is advantageous for the dry section of the roof module to be sealed from the wet section by means of seals in order to reliably preclude humidity from the wet section from entering the dry section.

The exhaust heat can be discharged from the roof module using the cooler by means of basically any cooling medium. The use of ambient air is particularly advantageous for this purpose, in which case the cooler is an air cooler. In order to implement air cooling, the wall of the wet section of the roof module can have at least one opening, preferably at least two openings. In this case, fresh air can be transported into the wet section through the opening, in particular through a first opening. Exhaust heat can be absorbed by heating the fresh air. Subsequently, the heated fresh air is transported out of the wet section through the opening, in particular through a second opening, and exhaust heat is discharged from the roof module. The airflow is improved if at least one separate opening is present for the air to flow in and at least one separate opening is present for the air to flow out.

The cooler can comprise a cooling fan which actively transports the cooling air through the roof module in order to enhance the cooling airflow.

The cooler can additionally comprise a cooling element in order to improve the heat transfer to the cooling air.

It is particularly advantageous for the cooling element to have cooling fins in order to thus increase the surface of the cooling element available for cooling. Cooling element fins of this kind are relatively compact and have a large cooling surface for transferring heat.

As an alternative to cooling the cooler using cooling air, the cooler can also be connected to the coolant circuit of the vehicle via an intersection. In this manner, the cooling circuit of the vehicle can be used to discharge the exhaust heat from the roof module. With a view to an effective temperature management in the roof module, it is advantageous for the roof module to comprise at least one temperature sensor which can be used to measure the temperature in the roof module.

In particular, this makes it possible for the temperature in the area of the environment sensor to be measured in order to limit the temperature of the environment sensor to an admissible degree and to achieve a cooling to a temperature blow a target temperature as quickly as possible.

In this case, the cooling capacity of the cooler can be particularly advantageously controlled in an open or closed loop as a function of the temperature measured by the temperature sensor in order to not exceed an intended target temperature or an intended limit temperature or to cool the temperature from an increased temperature range to a target temperature range as quickly as possible.

Basically any type of environment sensor can be installed in the roof module. The cooling in the roof module provided according to the invention is particularly advantageous if lidar sensors and/or radar sensors and/or camera sensors and/or multi-camera sensors are used.

An embodiment of the invention is schematically illustrated in the drawing and will be discussed as an example below.

BRIEF DESCRIPTIONS OF THE DRAWINGS

FIG. 1 is a schematic cross section of a roof module according to the invention.

DETAILED DESCRIPTION

FIG. 1 shows a roof module 01 in a cross section, only the parts of roof module 01 that are needed for understanding the invention being illustrated in FIG. 1. Roof module 01 comprises a panel component 02 for forming the roof skin 03 of a vehicle. An environment sensor 04 which can send and/or receive electromagnetic signals 15 for detecting the vehicle environment on the side facing the front of the vehicle is provided below roof skin 03 formed by panel component 02.

Environment sensor 04 is disposed in a dry section 05 which is protected from humidity and which is sealed from the outside in a liquid-tight manner. In this way, environment sensor 04 is reliably protected against the penetration of humidity. A wet section 06 which is sealed from dry section 05 is disposed behind dry section 05 in roof module 01. A cooler 07 for discharging exhaust heat from roof module 01 is located in wet section 06. A heat conducting element 08, which can be configured in the manner of a heat pipe or a metal plate part, such as a support plate, extends between cooler 07 and environment sensor 04. Environment sensor 04 is mounted in such a manner that a cooling surface 09 is disposed on the inner side of heat conducting element 08, which faces dry section 05. In this manner, the exhaust heat emitted by environment sensor 04 can be transferred to heat conducting element 08 very effectively.

The heat flow in heat conducting element 08 transfers the exhaust heat to cooler 07 in wet section 06. Cooler 07 comprises a cooling element 10 having a plurality of cooling fins 11. Cooling element 10 is fixed in such a manner that its foot surface, which points downward, is disposed on the inner side of heat conducting element 08, which faces wet section 06, so that the exhaust heat conducted in heat conducting element 08 is transferred to cooling element 10 with low resistance. This heats cooling fins 11 of cooling element 10. A cooling fan 12 can transport fresh air into wet section 06 through openings 13 so that fresh air flows past cooling fins 11. The fresh air is heated by absorbing the exhaust heat generated by environment sensor 04. The heated fresh air subsequently flows out of wet section 06 through openings 14 with the result that the heat is thereby entirely transported out of roof module 01.

A temperature sensor not illustrated in FIG. 1 can be used to measure the temperature of the heated fresh air flowing out through openings 14. The power of cooling fan 12 can be increased or lowered as a function of the measured temperature of the heated cooling air.

The invention claimed is:

1. A roof module for forming a vehicle roof on a motor vehicle, the roof module comprising:
a panel component whose outer surface at least partially forms the roof skin of the vehicle roof,
the roof module comprising at least one environment sensor configured to send and/or receive electromagnetic signals for detecting the vehicle environment,
wherein the environment sensor is disposed below the roof skin formed by the panel component,
a cooler configured to discharge exhaust heat emitted by the environment sensor and/or heat introduced from outside from the environment sensor,
wherein the environment sensor is disposed in a dry section of the roof module, the dry section being protected from humidity, the cooler being configured to discharge the exhaust heat emitted by the environment sensor from the dry section,
wherein the cooler comprises at least one heat conducting element, the heat conducting element being configured to discharge the exhaust heat emitted by the environment sensor
wherein the cooler is disposed in a wet section separate from the dry section, the exhaust heat emitted by the environment sensor being discharged from the dry section into the wet section by the heat conducting element,
wherein the environment sensor is fixed on a heat conducting element inner side, the heat conducting element inner side oriented towards the dry section, and
a cooling element of the cooler is also fixed on the heat conducting element inner side.

2. The roof module according to claim 1, wherein the environment sensor has at least one cooling surface, the cooling surface of the environment sensor coming to rest on the heat conducting element.

3. The roof module according to claim 1, wherein the heat conducting element is configured in the manner of a heat pipe or in the manner of a metal plate part.

4. The roof module according to claim 3, wherein the metal plate part serving as the heat conducting element is configured in the manner of a support plate.

5. The roof module according to claim 1, wherein the heat conducting element comes into contact with a cooling surface on the underside and/or with a cooling surface on at least one side surface of the environment sensor.

6. The roof module according to claim 1, wherein the dry section of the roof module is sealed from the wet section by seals.

7. The roof module according to claim 1, wherein the wall of the wet section has at least one opening, the opening serving to introduce fresh air into the wet section, and the opening serving to discharge exhaust air from the wet section.

8. The roof module according to claim 1, wherein the cooler comprises at least one cooling fan.

9. The roof module according to claim 1, wherein the cooler comprises a cooling element.

10. The roof module according to claim 9, wherein the cooling element has at least one cooling fin.

11. The roof module according to claim 1, wherein the cooler of the roof module is configured to be connected to the cooling circuit of the vehicle via intersections.

12. The roof module according to claim 1, wherein the roof module comprises at least one temperature sensor configured to measure the temperature in the roof module.

13. The roof module according to claim 12, wherein the roof module comprises at least one temperature sensor configured to measure the temperature in the area of the environment sensor.

14. The roof module according to claim 12, wherein the cooling capacity of the cooler is configured to be controlled in an open or closed loop as a function of the temperature measured by the temperature sensor.

15. The roof module according to claim 1, wherein the environment sensor is configured in the manner of a lidar sensor or in the manner of radar sensor or in the manner of a camera sensor or in the manner of a multi-camera sensor.

16. A motor vehicle comprising a roof module according to claim 1.

17. The roof module according to claim 1, wherein the environment sensor is configured in the manner of at least two of a lidar sensor, a radar sensor, a camera sensor, and a multi-camera sensor.

* * * * *